(No Model.)
S. D. ROWLAND.
VACUUM PAN.
No. 565,637. Patented Aug. 11, 1896.
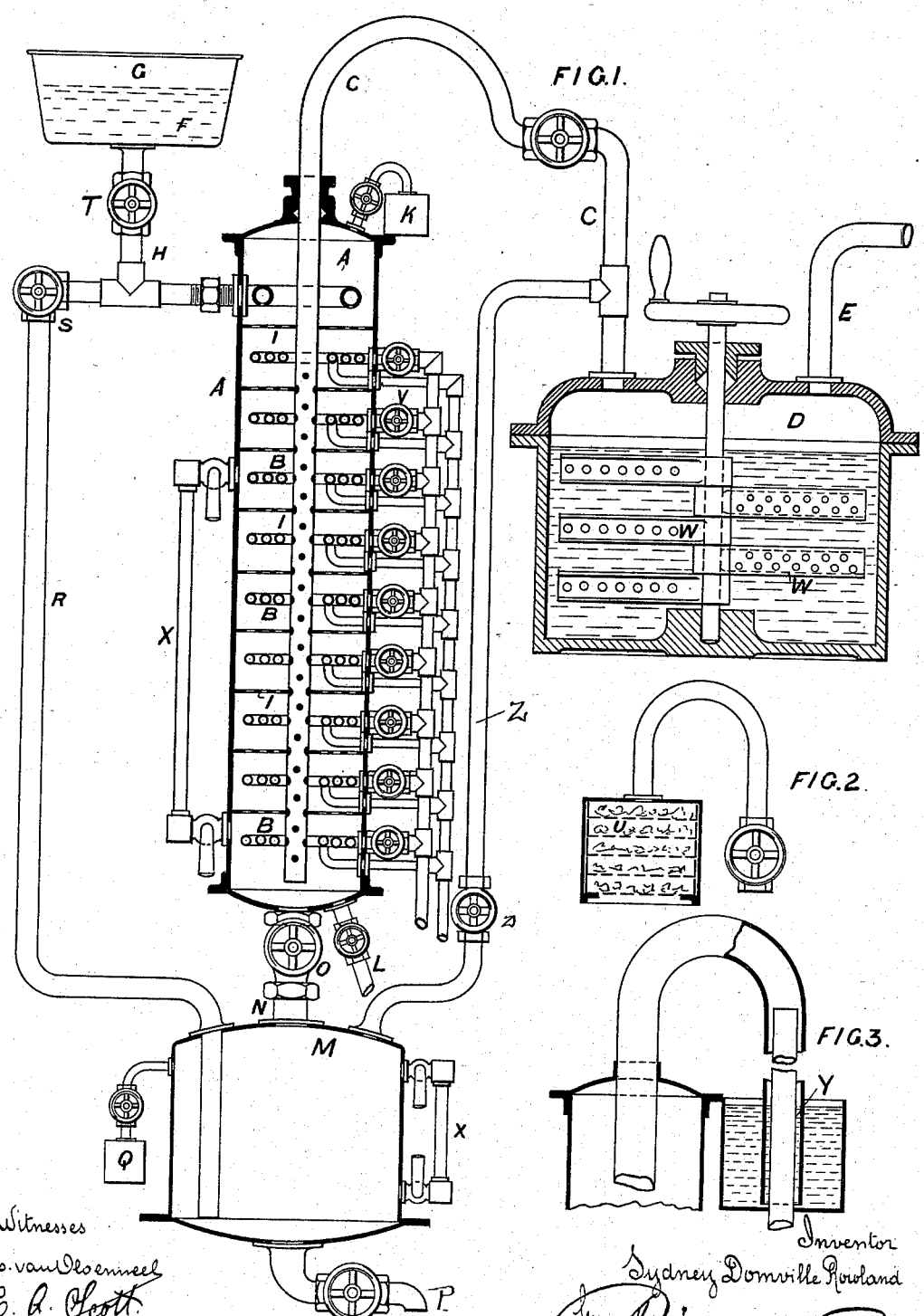

UNITED STATES PATENT OFFICE.

SYDNEY DOMVILLE ROWLAND, OF LONDON, ENGLAND.

VACUUM-PAN.

SPECIFICATION forming part of Letters Patent No. 565,637, dated August 11, 1896.

Application filed September 12, 1895. Serial No. 562,271. (No model.)

*To all whom it may concern:*

Be it known that I, SYDNEY DOMVILLE ROWLAND, a subject of the Queen of Great Britain and Ireland, residing at Toynbee Hall, Commercial Street, White Chapel, London, in the county of Middlesex, England, have invented certain new and useful Improvements in Concentrating Alimentary or Pharmaceutical Liquids or other Substances and in Apparatus Therefor, of which the following is a specification.

The object of my invention is to free alimentary or pharmaceutical liquids or other substances from some part of the water, alcohol, or other readily-procurable liquid which they may contain in such a way as to leave a concentrate or residue, which by mixture with a fresh quantity of the abstracted liquid will yield substantially the original liquid or substance.

In previous attempts to the same end the concentration has been effected entirely or in part by raising the temperature of the liquids or substances to be concentrated, and in the case of many such liquids or substances chemical or physical changes occur in the process of heating, and the concentrate or residue when again mixed with the separated liquid differs in chemical character and physiological or therapeutic properties from the original liquid or substance. On the other hand, concentration solely by the use of a vacuum is liable to the objection of causing partial or complete congelation of the liquid or substance treated. I attain my object without these disadvantages by evaporating the surplus liquid in a high vacuum and continuously supplying to the liquid or substance under treatment such a quantity of heat as is sufficient only to make up for that which is abstracted by the evaporation of the liquid vaporized.

My process is specially applicable to milk, which is known to suffer important changes when its temperature is raised.

Upon the accompanying drawings, which illustrate an arrangement of apparatus for carrying out my invention in the case of liquids, Figure 1 represents a general view of the apparatus. Fig. 2 is an enlarged view of a suitable air-inlet, and Fig. 3 a section showing mercurial seal for exhaust-pipe.

A is the vacuum-chamber; B, heating-coils; C, exhaust-pipe; D, absorbing-chamber; E, pipe leading to air-pump; F, liquid to be concentrated; G, trough or cistern; H, pipe leading from cistern to vacuum-chamber A; I, perforated trays; K, air-inlet; L, draw-off; M, lower chamber; N, pipe from chamber A to chamber M; O, stop-cock; P, draw-off; Q, air-inlet; R, ascension-pipe; S, stop-cock; T, regulating-valve; U, cotton-wool; V, cocks for controlling flow through coils; W, agitator; X, gage-glass; Y, mercury seal; Z, air-pipe leading to exhaust-pipe C.

The concentration takes place in the closed vacuum-chamber A, which is provided with external heating-jacket or internal hot-water-circulation coils B or with both, or with other suitable arrangements for providing surfaces heated to a definite extent. This chamber A communicates, by means of the pipe C, perforated at its lower end, with a second closed chamber D, containing a suitable absorbent of that part of the liquid which is to be vaporized. From this second chamber D a pipe E leads to an air-pump capable of producing a high vacuum. The liquid to be treated, F, is led from the trough or cistern G through the pipe H onto the perforated tray I, arranged within the vacuum-chamber A, whence it traverses the heated surfaces of the coils B, of which the temperature is so adjusted as to continuously replace enough of the heat lost by evaporation to prevent freezing, while not supplying enough heat to raise the residual product to a temperature at which the changes which I wish to avoid may occur. In this way the liquid gradually loses its superfluous water or other diluent, and when the process of concentration has gone sufficiently far air is readmitted through the valve or cock K and the product drawn off at L, the air being sterilized, when necessary, before readmission by being caused to pass through one or more layers of cotton-wool U, or by other suitable means, or I may arrange for the process to be carried on continuously, in which case I connect the lower portion of the vacuum-chamber A with a supplementary chamber M by pipe N, the communication being controlled by means of a valve or stop-cock O. From this chamber the concentrate is drawn off through the cock P, air being admitted by the cock Q and sterilized, as above described, the cock O being kept closed during the operation of drawing off. The concentrate thus obtained may be preserved in any suitable way, and by readmixture with the same amount of liquid which was previously evaporated will yield substantially the original liquid.

I may allow the liquid under treatment to trickle down the heating-surfaces or I may determine a circulation up and down in any suitable way. Where desirable I may before drawing off the concentrate from the chamber M cause it to reënter the vacuum-chamber A through the pipe R by opening the cocks Q and S, the cocks O and T being kept closed, in this way retaining the vacuum in the chamber A and causing the concentrate to flow down the heated surfaces of the coils B, as in the previous operation. In order to restore the vacuum in the chamber M after this operation, I may connect the chamber M to the exhaust-pipe C by the pipe Z, controlled by a suitable cock or valve z. The sterilization of the air may be effected by causing it to pass through the layers of cotton-wool U (shown in Fig. 2) before entering the chamber A or M, and the exhaust-pipe C may be connected to the chamber A by means of the mercurial-seal joint shown in Fig. 3, in order to facilitate the removal of the cover of the chamber when desired, the depth or height of the seal of mercury under the vacuum being in excess of that of the barometer.

In some cases I may prefer to separate the liquid into two parts and apply the process of concentration to them separately or to one of them alone, remixing them for preservation after the concentrating process. Such cases are those in which one constituent of the liquid may during the process of concentration be injuriously affected by it or injuriously affect the remainder and in which it is possible mechanically or otherwise to separate such constituent. Thus in the case of milk I prefer to separate the cream and treat the remaining milk, subsequently mixing the residue with the cream, as in this way I find that the fat-globules are prevented from being broken up.

For the absorption of water I prefer, but do not necessarily restrict myself to, strong sulfuric acid suitably agitated by arms W. In the case of solid substances containing liquids which it is desired to remove for the purpose of concentration, as, for instance, vegetables, I finely divide them with a mincing-machine or a pulper of ordinary construction or otherwise before applying my invention, so that for the purposes of the process they may act substantially as a liquid does, and I then treat them in a manner similar to that described in regard to liquids.

I may, if necessary, apply means for cooling the sulfuric acid, as, for instance, by causing it to circulate within refrigerating-coils, and I may also or alternatively substitute for or combine with or apply in succession to the process of exhaustion and absorption which I have described above an exhaustion and simultaneous absorption by means of a sulfuric-acid pump arranged on the Geissler, Sprengel, or equivalent system, or in lieu of absorbing the vapors I may arrange to condense or freeze them by any suitable apparatus.

I am aware that concentrates of alimentary or pharmaceutical products have been obtained by the combined action of a vacuum and of heat; but in such cases some part of the evaporation is obtained by the direct absorption of heat communicated to the liquid.

My invention consists in the process and apparatus described for obtaining the concentration at ordinary temperatures by means of the vacuum alone, the heat communicated serving not to convert the liquid into vapor, but to prevent its partial or complete solidification.

Having now described my invention, what I claim as new, and desire to secure by Letters Patent, is—

In combination, the chamber A, the vacuum-pipe leading therefrom, the means for heating the chamber, the chamber M, the valved connection between the same and the chamber A, through which the contents of the chamber A may be discharged into the chamber M, the air-valve controlling the air supply in the chamber M, the return-pipe R from the chamber M to the chamber A, the valve therein and the valved vacuum-pipe leading from the chamber M, said vacuum-pipe being independent of the return-pipe R substantially as described.

In testimony whereof I affix my signature in presence of two witnesses.

SYDNEY DOMVILLE ROWLAND.

Witnesses:
GEO. W. WHITTON,
T. J. OSMAN.